(12) United States Patent
Rapaport et al.

(10) Patent No.: US 8,192,885 B2
(45) Date of Patent: Jun. 5, 2012

(54) SHUTDOWN STRATEGY FOR ENHANCED WATER MANAGEMENT

(75) Inventors: Pinkhas A. Rapaport, Penfield, NY (US); Steven R. Falta, Honeoye Falls, NY (US); Derek R. Lebzelter, Fairport, NY (US); Eric J. Connor, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 666 days.

(21) Appl. No.: 12/359,736

(22) Filed: Jan. 26, 2009

(65) Prior Publication Data

US 2010/0190078 A1    Jul. 29, 2010

(51) Int. Cl.
*H01M 8/04* (2006.01)

(52) U.S. Cl. .................. 429/444; 429/414; 429/429

(58) Field of Classification Search .................. None
See application file for complete search history.

(56) References Cited

U.S. PATENT DOCUMENTS

| | | | |
|---|---|---|---|
| 5,798,186 A | 8/1998 | Fletcher et al. | |
| 6,068,941 A | 5/2000 | Fuller et al. | |
| 6,322,914 B1 | 11/2001 | Chow et al. | |
| 6,479,177 B1 | 11/2002 | Roberts et al. | |
| 6,753,106 B2 | 6/2004 | Chow et al. | |
| 6,787,257 B2 | 9/2004 | James et al. | |
| 6,926,980 B2 | 8/2005 | Kato et al. | |
| 7,718,289 B2 * | 5/2010 | Asai et al. | 429/408 |
| 7,862,942 B2 * | 1/2011 | Salvador et al. | 429/429 |
| 2002/0009623 A1 * | 1/2002 | St-Pierre et al. | 429/13 |
| 2009/0258257 A1 * | 10/2009 | Kaito | 429/13 |
| 2011/0033763 A1 * | 2/2011 | Adcock et al. | 429/429 |

* cited by examiner

*Primary Examiner* — Michael Zarroli
(74) *Attorney, Agent, or Firm* — John A. Miller; Miller IP Group, PLC

(57) ABSTRACT

A system and method for providing a fuel cell stack purge to remove excess water during system shut-down. A compressor is operated at a shut-down speed to force water out of the cathode flow channels and draw water through the membrane from the anode flow channels so that a desired amount of water is removed from the fuel cell stack without over drying the membrane. The cathode shut-down purge flow can be introduced in the forward or reverse direction. Further, the flow of hydrogen fuel can be directed so that it flows through the anode flow channels in an opposite direction to push water out of an anode outlet manifold into the anode flow channels so that it will also be drawn through the membrane by the cathode airflow. Finally, a brief rehydration step is added after the shut-down purge to achieve the desired water content in the cells.

18 Claims, 1 Drawing Sheet

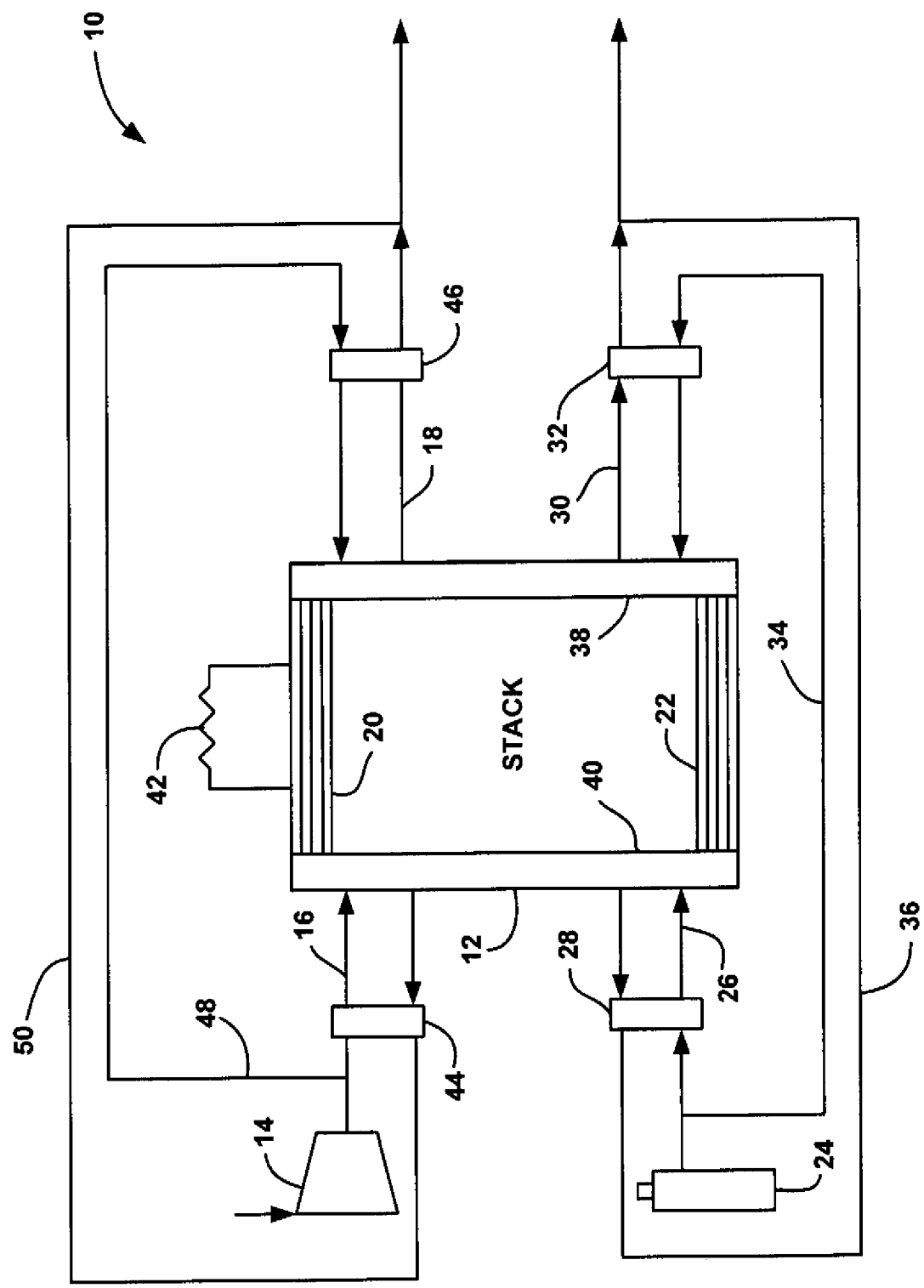

US 8,192,885 B2

SHUTDOWN STRATEGY FOR ENHANCED WATER MANAGEMENT

BACKGROUND OF THE INVENTION

1. Field of the Invention

This invention relates generally to a system and method for purging excess water from a fuel cell stack and, more particularly, to a system and method for purging excess water from a fuel cell stack at system shut-down that includes providing a forward or reverse cathode side air flow purge and/or a reverse hydrogen flow through the anode flow channels to push water from outlet ends of the anode flow channels.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode side catalyst to generate free protons and electrons. The protons pass through the electrolyte to the cathode. The protons react with the oxygen and the electrons in the cathode side catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode electrodes (catalyst layers) typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). Each MEA is usually sandwiched between two sheets of porous material, a gas diffusion layer (GDL), that protects the mechanical integrity of the membrane and helps in uniform reactant and humidity distribution. The part of the MEA that separates the anode and cathode flows is called the active area, and only in this area the water vapors can be freely exchanged between the anode and cathode. MEAs are relatively expensive to manufacture and require certain humidification conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a reaction by-product. The fuel cell stack also receives an anode hydrogen reactant gas that flows into the anode side of the stack. The stack also includes flow channels through which a cooling fluid flows.

A fuel cell stack includes a series of bipolar plates (separators) positioned between the several MEAs in the stack, where the bipolar plates and the MEAs are positioned between the two end plates. The bipolar plates include anode side and cathode side flow distributors (flow fields) for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The membranes within a fuel cell need to have certain water content, or humidification, so that the ionic resistance across the membrane is low enough to effectively conduct protons. This humidification may come from the stack water by-product or external humidification. The flow of hydrogen through the anode gas flow channels has some drying effect on the membrane, most noticeably at an inlet of the hydrogen flow. However, the accumulation of water droplets within the anode gas flow channels could prevent hydrogen from flowing therethrough, and cause the cell to fail because of low reactant gas flow, thus affecting the stack stability. The accumulation of water in the reactant gas flow channels as well as within the GDL is particularly troublesome at low stack output loads.

During fuel cell system shut-down, it is desirable to provide the cell membranes with a certain amount of water content so they are not too wet or too dry. A membrane that is too wet may cause problems during low temperature environments where freezing of the water in the fuel cell stack could produce ice that blocks flow channels and affects the restart of the system. Membranes that are too dry may have too low of an electrical conductivity at the next system restart that affects restart performance and may reduce stack durability.

It is known in the art to purge excess water from the flow channels in a fuel cell stack at system shut-down by forcing compressor air through the cathode flow channels and hydrogen gas through the anode flow channels. The duration of the purge and the speed of the gas flow are selected so that the excess water is removed from the flow channels and GDL, but the membranes do not become too dry. One problem with such a purge approach is that there may be a spread of resistance of the cells in the fuel cell stack, meaning some of the cells may be too dry and others may be too wet. Also, in each individual cell an inlet to outlet (mainly defined by cathode flow) water content (resistance) gradient can be observed. Further, purging the anode flow channels with hydrogen gas wastes hydrogen fuel.

It has been proposed in the art to eliminate the anode side purge using the hydrogen gas and use only the cathode side purge using compressor air. During the cathode side purge, water is removed from cathode channels and cathode side GDL. Water is also drawn from the anode side GDL and flow channels through the cell membranes, which typically is effective in removing enough water from the anode side of the active area. However, the parts of the anode and cathode flow fields directly adjacent to the cell inlet and/or outlet normally are outside of the active area, so no water vapor exchange through the MEA is possible. Therefore, when the cell (stack) purge is performed only on the cathode side, all water that has accumulated at the very exit of the anode channels cannot be removed. Thus, one can expect problems restarting the stack, particularly during subfreezing temperature conditions when ice at the anode outlet may block the hydrogen flow through the cell.

SUMMARY OF THE INVENTION

In accordance with the teachings of the present invention, a system and method are disclosed for providing a fuel cell stack purge to remove excess water during system shut-down, and to also decrease the cell to cell, as well as within cell, MEA humidification spread, which is beneficial for subsequent restart. A compressor provides cathode air to the cathode side of the fuel cell stack and a hydrogen source provides hydrogen fuel to an anode side of the fuel cell stack. During the shut-down operation, the compressor is operated at a shut-down speed, which is higher than needed for the low power operation over the shut-down period, to force water out of the cathode flow channels and draw water through the membrane from the anode flow channels. Further, anode inlet and outlet valves are used to redirect the flow of the hydrogen fuel from the hydrogen source so that it flows through the anode flow channels in an opposite direction to push water out of anode flow field outlets into the anode flow channels located in the active area of the cell, so that the water will also be drawn through the membrane by the cathode airflow. Thus, a desired amount of water is removed from the fuel cell stack without creating any significant cell to cell variation in MEA water content. Furthermore, at the end of the shut-down purge period, a very brief increase of power can be applied at regular (non-elevated) flow rates in order to adjust the inlet to outlet MEA water content distribution (rehydration), which also decreases any cell-to-cell variation in MEA water content that may have occurred.

Additional features of the present invention will become apparent from the following description and appended claims, taken in conjunction with the accompanying drawings.

BRIEF DESCRIPTION OF THE DRAWING

FIG. 1 is a schematic block diagram of a fuel cell system including piping for providing reverse cathode and anode flow during stack purging.

DETAILED DESCRIPTION OF THE EMBODIMENTS

The following discussion of the embodiments of the invention directed to a system and method for purging excess water from a fuel cell stack at system shut-down is merely exemplary in nature, and is in no way intended to limit the invention or its applications or uses.

FIG. 1 is a schematic block diagram of a fuel cell system 10 including a fuel cell stack 12 with reactant cathode flow channels 20 and reactant anode flow channels 22. The fuel cell system 10 also includes a compressor 14 that provides cathode air to the cathode side of the stack 12 on a cathode input line 16 through a cathode input valve 44. Cathode exhaust is output from the fuel cell stack 12 on a cathode exhaust gas line 18 through a cathode output valve 46. Hydrogen fuel is provided to the anode side of the fuel cell stack 12 under pressure from a hydrogen source 24, such as a high pressure tank, on an anode input line 26 through an anode input valve 28. Anode exhaust gas is output from the stack 12 on an anode exhaust gas line 30 through an anode output valve 32.

The cathode valves 44 and 46 are switched to a forward flow position during normal system operation, so that the air from the compressor 14 flows in a forward direction through the stack 12. For reasons that will be discussed in detail below, the input valve 44 and the output valve 46 can be switched to a reverse flow position to reverse the flow of air through the cathode flow channels 20 in the stack 12 so that the air from the compressor 14 flows through line 48, then through the output valve 46, then through the cathode flow channels 20 in the stack 12, then through the input valve 44 and then through line 50 to be sent into the cathode exhaust line 18. Thus, the valves 44 and 46 can be selectively switched to control the direction of the flow of cathode air through the cathode flow channels 20 in the stack 12 using the compressor 14.

The valves 28 and 32 are switched to a forward flow position during normal system operation so that the hydrogen fuel from the source 24 flows in a forward direction through the stack 12. For reasons that will also be discussed in detail below, the input valve 28 and the output valve 32 can be switched to a reverse flow position to reverse the flow of the hydrogen fuel through the anode flow channels 22 in the stack 12 so that the hydrogen fuel from the source 24 flows through line 34, then through the output valve 32, then through the anode flow channels 22 in the stack 12, then through the input valve 28 and then through line 36 to be sent into the anode exhaust line 30. Thus, the valves 28 and 32 can be selectively switched to control the direction of the flow of the hydrogen through the anode flow channels 22 in the stack 12 using the pressure provided by the hydrogen in the source 24.

As discussed above, the fuel cell stack 12 needs to be purged of water at system shut-down. Further, as also discussed above, water sometimes collects at anode flow field outlets 38 of each fuel cell in the stack 12. As will be discussed below, the present invention solves the problem of removing water that has collected in the anode outlets 38 during the shut-down purge.

During system shut-down, the stack 12 is purged to remove excess water from the cathode and anode flow channels 20 and 22, but without over drying the membranes within the fuel cells in the stack 12. In one embodiment, the compressor 14 is operated at a predetermined speed to force air through the cathode flow channels 20 to push water out of the flow channels 20 and also draw water through the membranes in the fuel cells from the anode flow channels 22. In one embodiment, the valves 44 and 46 are in the normal operation position so the flow of the cathode air through the flow channels 20 is in a forward direction to remove water therefrom. Because the relative humidity at the outlet end 38 of the flow channels 20 will typically be higher than at an inlet end 40 of the flow channels 20, it may be desirable to reverse the flow direction of the cathode air through the cathode flow channels 20 by switching the valves 44 and 46 so the cathode air flows in the opposite or reverse direction, as discussed above. In this manner, the wetness in the cathode flow channels 20 will be distributed across the cathode flow field by the flow of the cathode air by pushing water from the outlet end 38 of the cathode flow channels 20 towards the inlet end 40 of the cathode flow channels 20.

Hydrogen from the hydrogen source 24 may or may not be used to purge water from the anode flow channels 22. If the cathode air flow is being used to draw water through the membranes of the fuel cells into the cathode side to purge the anode flow field of the stack 12 so that the hydrogen is not used to purge the anode side of the stack 12, then water may collect at the outlet end 38 of the anode flow channels 22. Thus, according to another embodiment of the invention, the valves 28 and 32 are switched to the reverse flow position so that a low flow of the hydrogen fuel from the source 24 causes water that may have collected at the anode flow field outlet 38 to be forced into the active part of the anode flow channels 22 where it can be drawn through the membranes by the cathode side flow. As with the cathode side discussed above, the inlet end 40 of the anode flow channels 22 will be drier than the outlet end 38 of the anode flow channels 22 so that the water at the anode outlet 38 of the anode flow channels 22 will be pushed back into the flow field providing a distribution of the wetness in the anode side of the anode flow field across the active area.

This purge utilizing cathode air flow coupled with reverse hydrogen flow accomplishes two things. First, it removes water from the system and second, it decreases the in-plane moisture gradient in the membrane active area by pushing moisture that has built up at the anode flow field outlet 38 of the stack 12 back into the active area towards the anode inlet end 40. This redistributes moisture across the membranes more uniformly, some of which permeates through the membrane to the cathode side. Once in the cathode region, the water is pushed out of the stack 12 via the cathode air flow through the cathode exhaust line 18. Thus, water is removed and the water-content gradient of the membranes is significantly decreased.

In another non-limiting embodiment, both the cathode and anode flows may be reversed during the shut-down purge. Such an embodiment also purges water from the system 10, including water in the anode and cathode flow field outlets 38, while decreasing the water content gradient of the membranes.

During the last phase of the shut-down purge process a rehydration step may be used, which involves increasing the stack power and applying it to a load 42 to operate the fuel cell stack 12 so that it generates water as a by-product. This water generation serves to decrease the cell to cell spread of water content, which reflects the status of humidification, thereby ensuring all cells will have adequate hydration to function as desired the next system restart. Because this rehydration step is short, there is no time for the water generated to diffuse into the GDL or further.

The purge duration, the purge speed and other purge parameters, including the parameters of the rehydration step, are selected so that the proper amount of water is removed from the stack 12 without over drying the membranes. In one non-limiting embodiment, the reverse flow of at least the hydrogen fuel has a duration of 30 seconds to 1 minute, whereas the rehydration step has a duration from 10 to 20 seconds. The purge should be long enough for the stack 12 to be cleared of water, and thereafter, the load 42 can be applied to the stack 12 to produce an amount of water sufficient to hydrate the membranes only. The load 42 coupled across the stack 12 during the shut-down procedure may be used to power the compressor 14, or the stack power may be used to charge a system battery.

Although a specific configuration of valves and piping is shown in FIG. 1 and described to reverse the flow of cathode air and hydrogen fuel through the cathode and anode flow channels 20 and 22 to push water from the outlets 38 of the cathode and anode flow field back into the active area of the cells, the present invention contemplates any suitable procedure and/or configuration of elements that causes the water in the anode outlets 38 to be pushed back into the active area of the cell during the system purge.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
a fuel cell stack including a cathode side and an anode side;
a compressor providing cathode air to the cathode side of the fuel cell stack; and
a hydrogen source providing hydrogen gas to the anode side of the fuel cell stack, said system operating in a shut-down mode for removing water from the fuel cell stack, said shut-down mode causing the cathode air or the hydrogen gas to flow in an opposite or reverse direction through the fuel cell stack to provide a uniform wetness in a flow field of the fuel cell stack.

2. The system according to claim 1 further comprising a cathode inlet valve and a cathode outlet valve, said cathode inlet valve and said cathode outlet valve being switched to a reverse flow direction during the shut-down mode to cause the cathode air to flow in an opposite direction through cathode flow channels in the cathode side of the fuel cell stack to push water out of an outlet end of the cathode flow channels to provide the uniform wetness through a cathode flow field in the fuel cell stack.

3. The system according to claim 1 further comprising an anode inlet valve and an anode outlet valve, said anode inlet valve and said anode outlet valve being switched to a reverse flow direction during the shut-down mode to cause the hydrogen gas from the hydrogen source to flow in an opposite direction through anode flow channels in the anode side of the fuel cell stack to push water out of an outlet end of the anode flow channels to provide the uniform wetness through an anode flow field in the fuel cell stack.

4. The system according to claim 1 further comprising a cathode inlet valve and a cathode outlet valve, said cathode inlet valve and said cathode outlet valve being switched to a reverse flow direction during the shut-down mode to cause the cathode air to flow in an opposite direction through cathode flow channels in the cathode side of the fuel cell stack to push water out of an outlet end of the cathode flow channels to provide the uniform wetness through a cathode flow field in the fuel cell stack and further comprising an anode inlet valve and an anode outlet valve, said anode inlet valve and said anode outlet valve being switched to a reverse flow direction during the shut-down mode to cause the hydrogen gas from the hydrogen source to flow in an opposite direction through anode flow channels in the anode side of the fuel cell stack to push water out of an outlet end of the anode flow channels to provide the uniform wetness through an anode flow field in the fuel cell stack.

5. The system according to claim 1 wherein a cathode air flow through cathode flow channels in the cathode side of the fuel cell stack draws water from the anode side of the fuel cell stack.

6. The system according to claim 1 further comprising a system load, said fuel cell stack being coupled to the system load at an end of the shut-down mode so as to provide rehydration of membranes in the fuel cell stack.

7. The system according to claim 1 wherein the shut-down mode maintains the membranes with a predetermined amount of relative humidity.

8. The system according to claim 1 wherein the anode flow is a reverse direction and the cathode flow is in a forward direction during the shut-down mode.

9. The system according to claim 1 wherein both the anode flow and the cathode flow are in a reverse direction during the shut-down mode.

10. The system according to claim 1 wherein the hydrogen source is a pressurized hydrogen source that provides the flow of hydrogen fuel.

11. A fuel cell system comprising:
a fuel cell stack including a cathode side and an anode side;
a compressor providing cathode air to the cathode side of the fuel cell stack;
a hydrogen source providing hydrogen gas to the anode side of the fuel cell stack; and
a configuration of valves and piping that allows the hydrogen gas from the hydrogen source to flow through anode flow channels in the anode side of the fuel cell stack in a forward flow direction during normal operation of the fuel cell stack and through the anode flow channels in the anode side of the fuel cell stack in a reverse flow direction during a shut-down mode of the fuel cell system to remove water from the fuel cell stack, wherein during the shut-down mode, air from the compressor flows through the cathode side of the fuel cell stack and draws water through cell membranes from the anode side of the fuel cell stack and the reverse flow of the hydrogen gas through the anode flow channels causes water that has collected in an anode outlet to be pushed into the anode flow channels to be drawn into the cathode side of the fuel cell stack.

12. The system according to claim 11 wherein the configuration of valves includes an anode inlet valve and an anode outlet valve.

13. The system according to claim 11 further comprising a system load, said fuel cell stack being coupled to the system load at an end of the shut-down mode so as to provide rehydration of membranes in the fuel cell stack.

14. The system according to claim 11 wherein the cathode air also flows in a reverse direction during the shut-down mode.

15. A method for purging water from a fuel cell stack at system shut-down, said method comprising:

directing air from a compressor through a cathode side of the fuel cell stack to force water out of cathode flow channels in the cathode side of the fuel cell stack and draw water through fuel cell membranes from anode flow channels in an anode side of the fuel cell stack; and reversing a flow direction of hydrogen gas through an anode side of the fuel cell stack so that the reverse flow direction of the hydrogen gas pushes water from an anode outlet into anode flow channels to be drawn through the fuel cell membranes into the cathode flow channels.

16. The method according to claim 15 wherein reversing the direction of flow of the hydrogen gas includes switching an anode inlet valve and an anode outlet valve.

17. The method according to claim 15 further comprising coupling a load to the fuel cell stack at an end of the purging process to provide rehydration of membranes in the fuel cell stack.

18. The method according to claim 15 wherein directing air from a compressor through a cathode side of the fuel cell stack includes directing air through the cathode side in a reverse direction to provide a uniform wetness across a cathode flow field.

* * * * *